(12) United States Patent
Engelen et al.

(10) Patent No.: US 9,727,517 B2
(45) Date of Patent: Aug. 8, 2017

(54) WIRELESS DOCKING DEVICE

(71) Applicant: KONINKLIJKE PHILIPS N.V., Eindhoven (NL)

(72) Inventors: Dirk Valentinus Rene Engelen, Heusden-Zolder (BE); Jente De Pee, Eindhoven (NL); Gerardus Henricus Adrianus Johannes Broeksteeg, Veldhoven (NL); Annemarie Paulien Buddemeijer-Lock, Eindhoven (NL); Tess Speelpenning, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/784,591

(22) PCT Filed: Apr. 11, 2014

(86) PCT No.: PCT/EP2014/057421
§ 371 (c)(1),
(2) Date: Oct. 15, 2015

(87) PCT Pub. No.: WO2014/173705
PCT Pub. Date: Oct. 30, 2014

(65) Prior Publication Data
US 2016/0070670 A1 Mar. 10, 2016

(30) Foreign Application Priority Data
Apr. 25, 2013 (EP) .................................... 13165289

(51) Int. Cl.
*G06F 3/00* (2006.01)
*G06F 5/00* (2006.01)
(Continued)

(52) U.S. Cl.
CPC ........ *G06F 13/4081* (2013.01); *G06F 13/102* (2013.01); *H04L 63/105* (2013.01); *H04W 12/08* (2013.01); *H04W 88/08* (2013.01)

(58) Field of Classification Search
CPC .... G06F 13/4081; G06F 13/102; G06Q 10/10
(Continued)

(56) References Cited

U.S. PATENT DOCUMENTS 8,479,011 B2 * 7/2013 Ali .......................... G06F 21/34
713/182
8,826,446 B1 * 9/2014 Liu ...................... G06F 21/6245
726/1
(Continued)

FOREIGN PATENT DOCUMENTS

NL WO 2012117306 A1 * 9/2012 ......... H04L 63/0884
WO WO2010110956 A2 9/2010
(Continued)

OTHER PUBLICATIONS

Venturini Y.R. et al., "Security Model for Ad Hoc Networks", International Conference on Wireless Networks-1 OWN 02, Jun. 24, 2002 (Jun. 24, 2002).

*Primary Examiner* — Farley Abad
*Assistant Examiner* — Henry Yu
(74) *Attorney, Agent, or Firm* — Larry Liberchuk

(57) ABSTRACT

In a wireless docking system a dockee device (120) communicates with a host device (100) that is coupled to at least one peripheral (110, 111, 112). The host device has a host communication unit (102) and a docking processor (101) arranged for docking at least one dockee device. The dockee device has a dockee communication unit (121), and a dockee processor (122) for docking to the host device. The dockee processor is arranged for providing at least one virtual peripheral device in a virtual docking environment, the virtual peripheral device having a privacy level. When
(Continued)

docking, the virtual peripherals are mapped on actual peripherals so as to apply the privacy level to the actual peripheral. When docked, data transfer with the actual peripheral is controlled according to the respective peripheral privacy level.

15 Claims, 4 Drawing Sheets

(51) Int. Cl.

| | | |
|---|---|---|
| *G06F 13/12* | (2006.01) | |
| *G06F 13/00* | (2006.01) | |
| *G06F 13/42* | (2006.01) | |
| *G06F 13/22* | (2006.01) | |
| *G06F 13/40* | (2006.01) | |
| *H04L 29/06* | (2006.01) | |
| *H04W 12/08* | (2009.01) | |
| *H04W 88/08* | (2009.01) | |
| *G06F 13/10* | (2006.01) | |

(58) Field of Classification Search
 USPC ...... 710/46, 8, 10, 14, 16, 36, 62, 104, 105, 710/220, 303; 726/1, 27
 See application file for complete search history.

(56) References Cited

U.S. PATENT DOCUMENTS

| 8,869,301 | B2* | 10/2014 | Reeves | G06F 21/62 |
| | | | | 726/1 |
| 9,319,452 | B2* | 4/2016 | Kaushik | H04L 67/02 |
| 2008/0147684 | A1* | 6/2008 | Sadovsky | G06Q 10/10 |
| 2008/0252419 | A1 | 10/2008 | Batchelor | |
| 2009/0164993 | A1* | 6/2009 | Flake | G06F 9/45537 |
| | | | | 718/1 |
| 2012/0265913 | A1 | 10/2012 | Suumaki | |
| 2014/0223575 | A1* | 8/2014 | Nandi | G06Q 30/0282 |
| | | | | 726/27 |

FOREIGN PATENT DOCUMENTS

| WO | WO2012117306 A1 | 9/2012 |
| WO | WO2013038359 A1 | 3/2013 |

* cited by examiner

WIRELESS DOCKING DEVICE

FIELD OF THE INVENTION

The invention relates to a dockee device for wireless communication with a host device, the host device being arranged for coupling to at least one peripheral, the host device comprising a host communication unit for accommodating said wireless communication, and a docking processor arranged for wireless docking at least one dockee device for providing access to the at least one peripheral for the dockee device, the dockee device comprising a dockee communication unit for accommodating said wireless communication, and a dockee processor arranged for wireless docking to the host device for getting access to at least one actual peripheral.

The invention further relates to a host device for wireless communication to a dockee device, a method and a computer program product for wireless communication between a host and dockee devices.

The invention relates to the field of wireless communication, e.g. via Wi-Fi, and more specific to a setup for a wireless docking system. Wired docking stations for portable electronic devices typically have only a single physical docking connector to dock one device at a time. However, a wireless docking station, called a wireless docking host (WDH) or host device, may provide docking for multiple portable devices, called dockees, i.e. access to peripherals and their functions for extending or substituting the dockees functions, for example a large(r) screen, high(er) quality speakers, mouse and keyboard. For consulting and creating larger amounts of data, the local screen and the limited interaction means of portable devices are not sufficient. Wireless docking provides access to peripherals via a docking host. The dockee can be connected to a large range of peripherals in a so called Wireless Docking Environment. From that moment on, the wireless Docking environment and the Dockee act as a user friendly and ergonomic computing environment.

BACKGROUND OF THE INVENTION

WO 2012/117306A1 describes wireless docking in a system having a host device and dockee devices, which may be based on Wi-Fi (as described in IEEE802.11). The host device enables a dockee to access to a set of peripherals locally connected via a wire or wirelessly to the host device (such as USB mouse, HDMI display, Bluetooth headset) through a set of message exchange protocols over a wireless link (e.g. Wi-Fi). The wireless docking host may provide information about its presence through a Wi-Fi beacon that dockees can use to select and initiate connections with a chosen host. Alternatively, Near Field Communication (NFC) tags associated with the host or other out of band means (such as using the communications interface from a wireless power system) are used to select and initiate a host to dock with.

SUMMARY OF THE INVENTION

The wireless nature of the communication in the wireless docking system allows in principle to connect a plurality of dockees to a host simultaneously. Hence, as peripherals may be shared by multiple dockees, information from each dockee may now be shared between dockees. However, such sharing may not be intended by the user of the dockee device.

It is an object of the invention to provide a system for wireless docking that enables controlling which data is to be transferred and/or rendered via the peripherals.

For this purpose, according to an aspect of the invention, in the dockee device as described in the opening paragraph the dockee processor is arranged for providing at least one virtual peripheral device in a virtual docking environment, the virtual peripheral device having a privacy level configured by assigning a privacy level to the virtual peripheral, the privacy level defining a level of confidentiality that is indicative of a relation between a user of the dockee device and others having access to a respective peripheral, when docking, mapping the at least one virtual peripheral device on the at least one actual peripheral, the mapping comprising assigning the peripheral privacy level to the at least one actual peripheral, and when docked, controlling data transfer with the at least one actual peripheral according to the peripheral privacy level.

For this purpose, according to a further aspect of the invention, the method as described in the opening paragraph comprises, in the dockee device, providing at least one virtual peripheral device in a virtual docking environment, the virtual peripheral device having a privacy level, configuring the virtual peripheral by assigning a privacy level to the virtual peripheral, the privacy level defining a level of confidentiality that is indicative of a relation between a user of the dockee device and other persons having access to a respective peripheral, when docking, mapping the at least one virtual peripheral device on the at least one peripheral, the mapping comprising assigning the peripheral privacy level to the at least one actual peripheral, and when docked, controlling data transfer with the at least one actual peripheral according to the peripheral privacy level.

For this purpose, according to a further aspect of the invention, the computer program product as described in the opening paragraph comprises a program that is operative to cause a processor to perform the method as described above. In practice, the computer program product may be a so-called "app" to be installed and used on a smartphone or tablet.

The measures have the effect that, in the dockee device, a control system is provided for controlling which data is to be transferred and/or rendered via which actual peripherals, and which data is not transferred outside the dockee. Thereto the virtual docking environment provides one or more configurable virtual peripheral devices, each virtual peripheral device having a respective privacy level as configured by assigning a privacy level to the virtual peripheral. The privacy level defines a level of confidentiality to be assigned to a peripheral that is indicative of the relation between the user of the dockee device and others having access to said peripheral. Such other persons may have physical access to the peripheral, e.g. viewing a display or activating a button, or electronic access, e.g. reading an external memory. For example, the privacy level may be public level (indicating that there are no confidentiality restrictions), group level (indicating that the peripheral may be accessed by a known group), personal level (indicating that the peripheral may be accessed only in the presence of the owner of the dockee), or private level (indicating that the peripheral may be accessed only by the owner of the dockee). The type of access depends on the peripheral, for example for displays having access has the meaning of being visible. The virtual docking environment and the virtual peripherals therein, are maintained in the dockee device, e.g. stored and made accessible via a user interface. During docking, the virtual peripherals are mapped to actual peripherals that are accessible via the host. Mapping implies that the properties and restrictions defined for the virtual device are now applied to the mapped actual device, in particular the peripheral privacy level is assigned to the actual device. Optionally, together with privacy level and type, also other properties of the peripherals can be used in the mapping: screen size or screen resolution can be taken into account when mapping the presentation on multiple public presentation displays When the dockee is actually docked to the WDH, data transfer to the peripherals of the host is controlled in accordance with the privacy level just assigned to the peripheral. For example, a virtual audio peripheral speaker system has been provided in the virtual environment having a public level as its privacy level. Then, when docking, the public level of the virtual audio speaker system is assigned to the actual audio speaker system. Not all audio data is transferred to the speaker peripheral of the host to which the dockee is docked, but only data that the dockee determines to be in accordance with the privacy level assigned to the speaker system. So, when audio data for an audio peripheral is to be rendered, the dockee processor determines the nature of the data. For example, a ringtone generated by the mobile telephone has a personal privacy level, as it is to be rendered only in the presence of the owner of the mobile telephone. Such data, having the personal privacy level, is not transferred to the peripheral speaker system, but to the audio speaker in the mobile device itself, which due to its nature (i.e. the mobile phone being a personal device) has the personal privacy level. Advantageously, different types of data are routed to different peripherals according to the privacy levels of the respective peripherals. In particular, certain types of data having the personal or private level as the data privacy level will not be transferred and/or rendered via shared peripherals, unless such shared peripherals have been assigned the corresponding privacy level, or the data has been rated to a less restricted data privacy level corresponding to the intended peripheral. Moreover, the virtual environment and settings therein may be prepared prior to actual docking, and may be stored and reused later and/or in other docking systems. Advantageously, the user can conveniently manage the data transfer restrictions before being docked.

The invention is also based on the following recognition. Traditionally docking assumes that the dockee gets access to a peripheral so as to control the peripheral to perform its intended function, i.e. the peripheral "as it is". Any data going to the docked peripheral is to be controlled and/or routed by the user. Smartphones and tablets are getting more and more powerful, being able to store and run large amounts of content and applications, ranging from personal content/apps to public content/apps. Wireless docking enables the possibilities of these portable devices (dockees) to be extended even further by giving these dockee devices access to dedicated peripherals, such as large display, mouse, keyboard, webcam, etc. made accessible through a wireless docking host. Wireless docking use cases range from using a dockee at home for entertainment purposes, to professional usages in a meeting room, lecture room, home office, company office, public office, car, etc. The content and applications on the dockees is primarily meant for private use on the dockee only. However, during docking these contents and applications will now be transferred and/or rendered using the peripherals. Because of all these different usages/contexts for wireless docking, not all content and applications is suitable to be rendered on the peripherals in all these different contexts.

The inventors have seen that, whereas traditionally the data as such was to be controlled, that data privacy in a docking system may effectively be achieved by assigning a privacy level to a peripheral, in particular, to the peripheral as docked to the specific dockee. Such assigned privacy level is called a peripheral privacy level, and is applied to control data transfer and/or of data from that dockee on the actual peripheral. Thereto peripherals to be docked to are initially represented in a virtual environment as virtual peripherals, enabling to configure a virtual peripheral privacy level for that dockee. When docking, the virtual peripherals are mapped to the actual peripherals. In fact, a same peripheral may be shared by different dockees, and have possibly different privacy levels for each of the respective dockees.

Optionally, the dockee processor is arranged for providing a user interface for enabling configuring the virtual peripheral by assigning the privacy level. Advantageously, the user may set or change peripheral privacy levels of respective virtual peripherals, and/or may add or delete such virtual peripherals. Furthermore, a drag-drop interface may be provided using a graphical visualization of the virtual peripherals and/or actual peripherals being docked with. Furthermore, the dockee processor may be arranged for displaying the virtual docking environment for enabling the user to perceive which data is to be transferred and/or rendered by a respective peripheral. Via a user interface the user may perceive the virtual docking environment, and may also see types of data being controlled according to the respective assigned peripheral privacy levels. The system applies a range of at least two privacy levels, ranked according to increasing confidentiality, for example a set comprising at least one of public level, group level, personal level, private level.

Optionally, the dockee processor is arranged for providing multiple virtual peripheral devices of a same predefined type, respective ones of the multiple virtual peripheral devices having respective different peripheral privacy levels, and, when docked, controlling the data transfer to respective different actual peripherals according to the respective different peripheral privacy levels. Advantageously, when different instances of one type of data but having different data privacy levels are to be rendered, such instances are routed to different peripherals according to the privacy levels of the respective peripherals.

Optionally, the virtual peripheral device is of a predefined type being one of a virtual display screen; a virtual audio device; a virtual camera device. In practice, such peripherals are common, but further peripherals like in interactive smart board or touch screen, mechanical or motorized peripherals, etc. may be provided. In practice, such virtual display screen may have a peripheral privacy level for constituting one of a public presentation screen, a personal presentation screen, a private display screen, a group collaboration screen. The dockee processor may be arranged for providing the virtual display screen having a peripheral privacy level for constituting one of a public presentation screen, a personal presentation screen, a private display screen, a group collaboration screen. The dockee processor may be arranged for providing the virtual audio device having a peripheral privacy level for constituting one of a public audio installation, a group audio installation, a personal audio installation, a private audio device, a private audio recorder, an audio silencer. The dockee processor may be arranged for providing the virtual camera device having peripheral privacy level for constituting one of a public camera, a group camera, a personal camera, a private camera. A private camera may for example be mapped to a camera located in the bedroom of the owner of a smartphone.

Optionally, the virtual peripheral device is a virtual shared memory, and the dockee processor is arranged for, when docking, mapping the at least one virtual shared memory on an actual shared memory provided via the host device as the at least one actual peripheral, and, when docked, controlling data transfer with the actual shared memory according to the periphery privacy level. Advantageously, the user of the dockee device may controllably share data files via actual shared memory, while maintaining control over the data files that are shared, as defined prior by configuring the virtual memory in the virtual environment.

Optionally, the dockee processor is arranged for assigning a privacy level to selected data in the dockee device, and, when docked, controlling the data transfer with the at least one actual peripheral according to the peripheral privacy level and the data privacy level. This has the effect that the selected data will be routed to a peripheral that has at least the corresponding peripheral privacy level. A privacy level is considered to have a higher ranking if it indicates a more private level. Furthermore, the dockee processor may be arranged for assigning a privacy level to any data of a selected application in the dockee device, and, when docked, controlling the data transfer of the selected application with the at least one actual peripheral according to the peripheral privacy level and the data privacy level. Data as generated or imported by the application is controllably transferred to and/or from docked peripherals according to the peripheral privacy level and data privacy level assigned to the application. Furthermore, the dockee processor may be arranged for automatically assigning a predetermined privacy level to any data in the dockee device, and providing a user interface for enabling a user to override the automatically assigned predetermined privacy level by a selectable privacy level.

Optionally, the dockee processor is arranged for providing at least one presentation policy in the virtual docking environment, the presentation policy comprising at least one of
an assignment of data of elements in a multimedia presentation to a selected virtual peripheral to be applied when selecting the presentation policy;
an assignment of respective data of a same type as generated by an application to respective different virtual peripherals of a same type but having different peripheral privacy levels to be applied when selecting the presentation policy;
a mapping configuration to be applied when selecting the presentation policy;
a privacy level assignment for at least one virtual peripheral and/or a privacy level assignment for selected data and/or a selected application to be applied when selecting the presentation policy.

Optionally, the dockee processor is arranged for receiving configuration data from the host device, and for adapting the configuration of the virtual environment and/or the mapping in accordance with the configuration data. Also, the host device for wireless communication with such dockee device is arranged for coupling to at least one peripheral and comprises a host communication unit for accommodating said wireless communication, and a docking processor arranged for docking at least one dockee device for providing access to the at the least one peripheral for the dockee device. Here, the docking processor is arranged for providing the configuration data and sending the configuration data to the dockee device, e.g. via said wireless communication. The configuration data comprises at least one of
an instruction to create a virtual peripheral of a predefined type;
a peripheral privacy level for a virtual peripheral of a predefined type;
a peripheral privacy level for a docked peripheral of a predefined type;
a data privacy level for selected data in the dockee device;
a data privacy level for any data of a selected application in the dockee device;
a mapping instruction for mapping a virtual peripheral of a predefined type having a predefined privacy level on an actual peripheral as coupled to the host device, and the privacy level defining a level of confidentiality that is indicative of a relation between a user of the dockee device and other persons having access to a respective peripheral Optionally, the dockee processor is arranged for gathering configuration data, and for adapting the configuration of the virtual docking environment and/or the mapping in accordance with the configuration data, the configuration data comprising at least one of
location of the dockee (e.g. as determined by GPS and/or Wi-Fi or other means);
context of the dockee (e.g. as determined by audio information from its microphone and/or derived from names of Wi-Fi access point within range);
operating mode as set by the user (e.g. flight mode, hands-free car mode, meeting mode);
name of the wireless docking center and/or its docking environment type;
people tracking information/proximity detection.

Optionally, the at least one peripheral comprises at least one of a set of output peripherals like a beamer, a display screen, a loudspeaker system, a printer; or at least one of a set of input peripherals like a mouse, room control unit; or bidirectional peripherals like a smartboard, a data storage unit. Further preferred embodiments of the device and method according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described may have the same reference numerals.

DETAILED DESCRIPTION OF EMBODIMENTS

Wireless docking is about enabling portable devices, in this context called wireless dockees (WDs) or dockee devices to wirelessly connect to a group of peripherals via a host device, so that applications on the portable device can make use of these peripherals to improve the experience and productivity of working/interacting with these applications. The grouping of peripherals, the discovery/advertisement of groups of peripherals, managing the connections to groups of peripherals, is performed by a so-called wireless docking host (WDH), which makes its functionality available through a wireless docking protocol.

Possible wireless dockees include (but are not limited to) dockee phones, laptops, tablets, portable media players, cameras, electronic watches. Possible WDHs include (but are not limited to) dedicated wireless docking station devices, display devices, audio devices, printers, PCs. The wireless docking host may also be a small (PC like) dongle with a display, USB and audio interface. Possible peripherals include (but are not limited to) wireless mice, keyboards, display devices, audio devices, webcams, printers, storage devices, USB hubs. These peripherals are considered to support standards such as Wi-Fi Serial Bus and Wi-Fi Miracast to make their functionality available through the wireless network to other devices such as dockees and WDHs. Wired peripherals may be connected to the wireless host.

Figure 1:
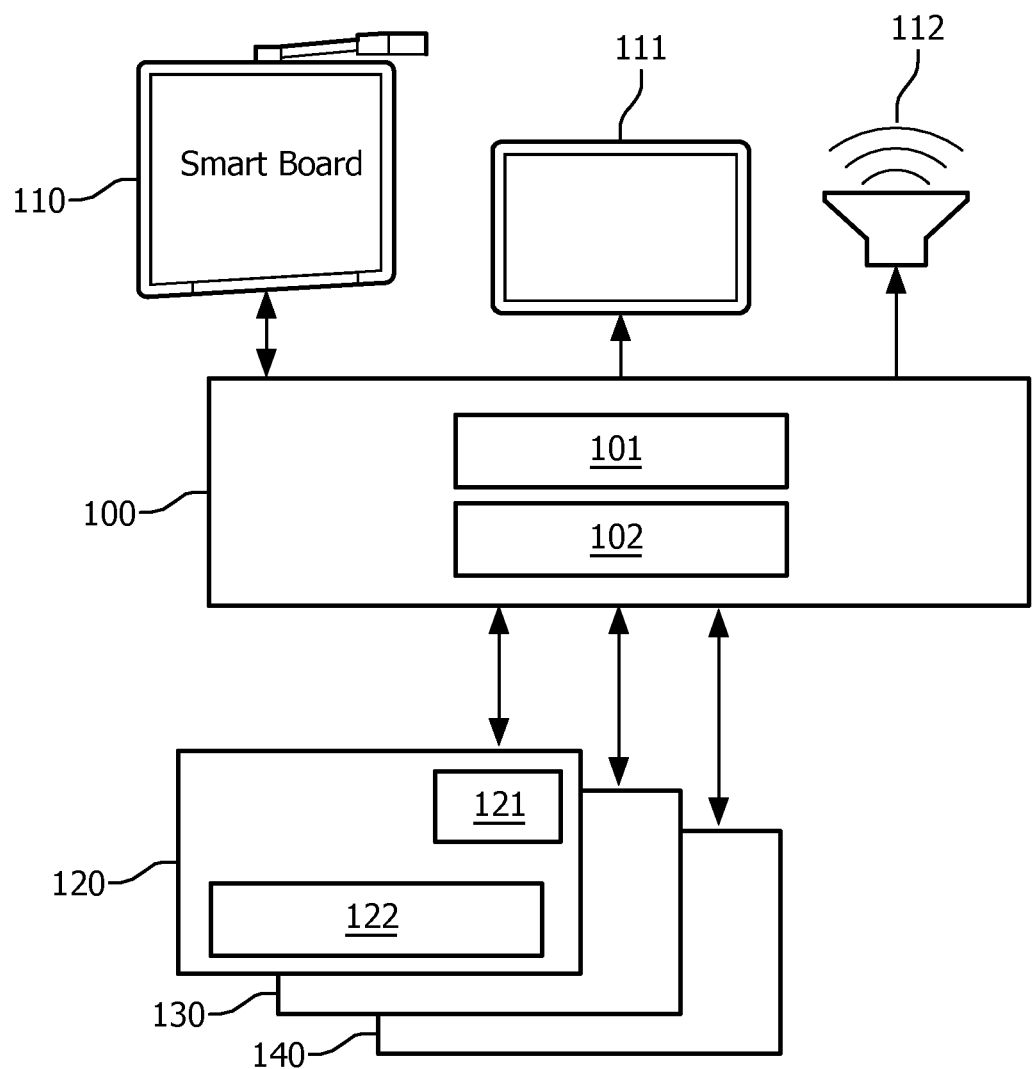
FIG. 1 shows an example of a wireless docking system.

FIG. 1 shows a wireless docking system. The system includes a host device 100 for wireless communication with one or more dockee devices 120, 130, 140, for example mobile phones, laptops or tablet computers. Only the first dockee device 120 is described in detail below, but further dockee devices have similar components and functions. The host device is coupled to a number of peripherals 110, 111, 112, for example peripherals for rendering audio or video (AV) data. It is noted that in this document AV data is used for any type of video data, audio data or a combination of video and audio data. The peripherals may include video output devices like a beamer or a display screen 111, graphical input/output devices like a smartboard 110 or a touch screen, audio output devices like a loudspeaker system 112 or a headphone, user control devices like a mouse or a room control unit; data processing devices like a data storage unit or a printer.

The host device 100 has a host communication unit 102 for accommodating said wireless communication, for example a WiFi unit, well known as such. The host device further has a docking processor 101 arranged for docking at least one dockee device for providing access to the at least one peripheral for the dockee. The process of docking a wireless device to a wireless docking host (WDH) is a process of establishing a data link via the available radio channel such as WiFi or Bluetooth, and is known as such as discussed above with reference to WO 2012/117306A1. A description of Bluetooth can be found, for example, in Bluetooth Specification, Core Package version 2.1+EDR, issued: 26 Jul. 2007. The docking process involves providing access to one or more peripherals for the dockee device.

The dockee device 120 has a dockee communication unit 121 for accommodating said wireless communication with the host. In practice, there may be multiple communication units for that purpose, for example Bluetooth, Wi-Fi and 60 GHz. The dockee device further has a dockee processor 122 arranged for docking, as a dockee device, with the host device for getting access to the at least one peripheral.

The dockee processor further has the following functions. The dockee processor 122 provides at least one virtual peripheral device in a virtual docking environment. The virtual docking environment is a data structure defining one or more virtual peripherals. A virtual peripheral is a data structure defining a peripheral device like a display, i.e. a device type and properties corresponding to actual devices that may become available in an actual docking system, such as a large display, a beamer or a loudspeaker system. In practice such data structures may be stored in tables or in database in a non-volatile memory of the dockee device.

Specifically, the virtual peripheral device has a privacy level, called a peripheral privacy level, which defines the level of confidentiality of data that may be handled by such peripheral according to the dockee, when actually docked to an actual peripheral of a type corresponding to the virtual peripheral.

The dockee processor is arranged for, when docking, mapping the at least one virtual peripheral device on the at least one peripheral. In said mapping, first a device type match is determined, so that the device type as defined for the virtual peripheral substantially corresponds to an available actual peripheral, e.g. a virtual display matching a display device coupled to the host. Furthermore, the status and confidentiality of the actual peripheral is acquired, e.g. by status information provided by said peripheral or by the host. Initially, all actual peripherals of the host may be set to a predetermined level, e.g. being public. Peripherals provided by the mobile dockee itself, such as the local display, may be set to personal level. Furthermore, the user may set, change or determine the privacy rating of any actual peripheral, and/or may set or adapt a mapping manually.

For example, in a new or unknown actual docking system, all actual peripherals will be considered to be public, and only virtual peripherals having the public privacy level, will be correspondingly mapped. The virtual display peripheral having the public privacy level will be mapped on the large display accessible via the host. Any display data having no confidentiality restrictions may now be routed to the actual large display screen coupled to the host. However, the local display on the dockee device itself will have the personal privacy level. Any display data having the personal level will automatically be routed to the small dockee display, and not to the large display. So, when docked, data transfer with the peripherals as docked via the host is controlled according to the periphery privacy level as defined in the virtual environment.

In summary, on the dockee, an environment of virtual devices is created, and their privacy level can be consulted by the user. A representation of a virtual environment with virtual devices is available on the dockee and can be consulted. In the virtual environment, the rendering of content is assigned to a virtual device. A default assignment may be predetermined, e.g. by the manufacturer of the dockee device. When the dockee docks at the host device, virtual devices are mapped to real peripheral devices in the docking environment. Via a user interface, the user of the dockee can see the configuration of the virtual peripherals and, when docked, see the mapping to actual peripherals. Also a representation may be displayed of how content is rendered and stored, how events are rendered. The user may adapt the configuration, for example set or adapt the mapping permanently or temporarily, overruling the automatic mapping for specific situations. It is noted that the manipulation of content and the management of the virtual environment can be done on the dockee, but, optionally, may also be done via the docking host when the dockee is docked.

Figure 2:
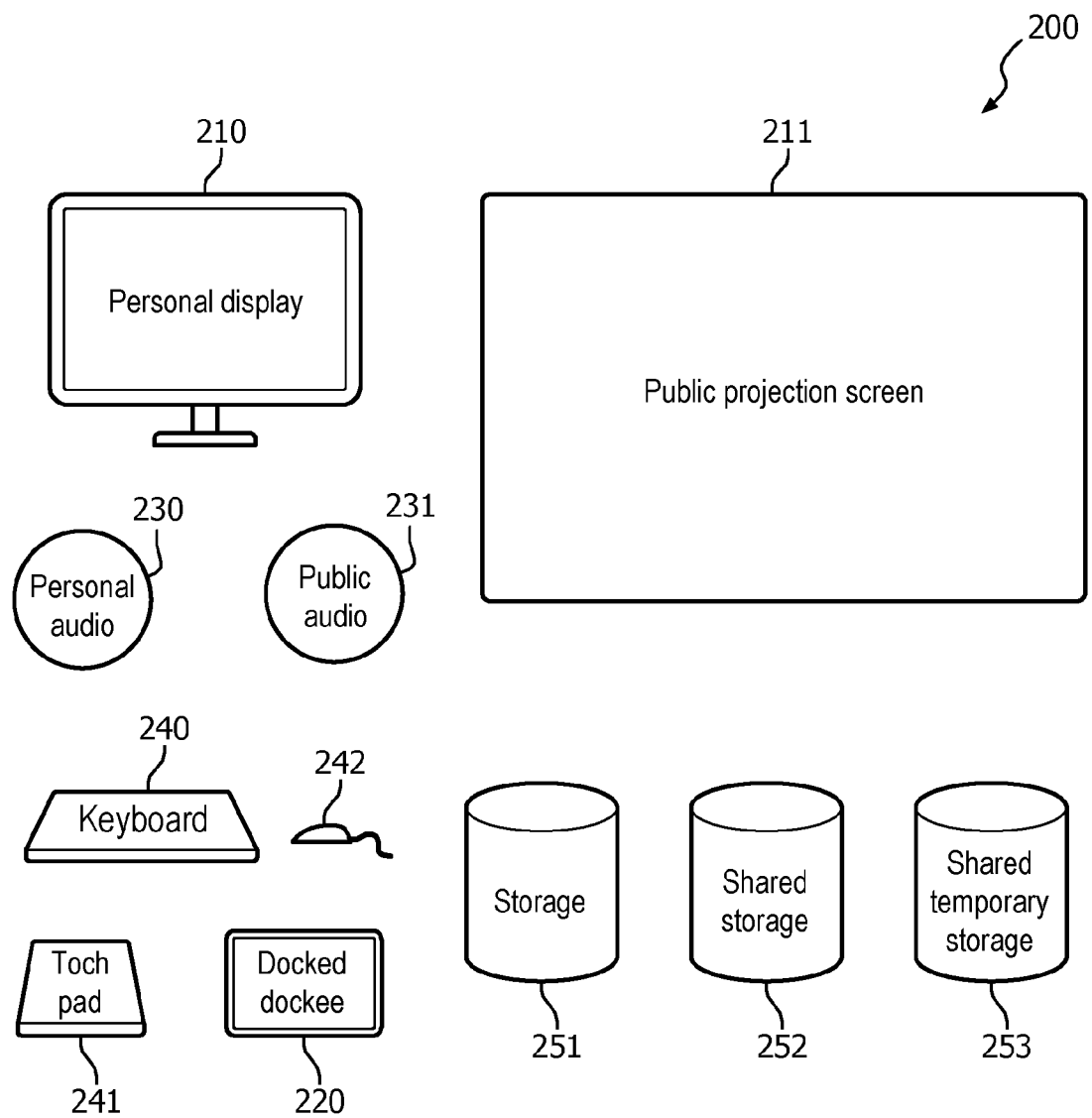
FIG. 2 shows a dockee in an environment of virtual devices.

FIG. 2 shows a dockee in an environment of virtual devices. The figure shows a dockee 220 and a number of virtual peripheral devices in a virtual environment 200, which virtual devices may be mapped to actual peripherals coupled to a host station (not shown as such). The virtual peripherals have been assigned a peripheral privacy level, and include a personal display 210, a public presentation screen 211 (e.g. using a beamer), a personal audio output device 230, a public audio output system (e.g. a loudspeaker system in a conference venue), input devices like a keyboard 240, a mouse 242 and a touchpad 241, and storage devices like a private storage 251, a public shared storage 252 and a group shared temporary storage 253.

As shown, various virtual devices may be included in such a virtual docking environment provided in the dockee. Detailed examples of virtual devices are Public presentation screen: such a device is used for showing presentation content to other people. Public means that the screen is intended for showing information to a (large) audience.

Personal Presentation screen: this screen is used for e.g. notes during the presentation. Personal means that the screen is intended to be used in the presence of the dockee user, but might be seen by others.

Private Display: means that only the dockee user is intended to see the screen. The display of a mobile phone is a typical example, but also the display at the home of the user can be considered as such a device.

Group screen: such a device is visible to a few people and is used to collaborate and share displayed data. When people are in a conference call, such screen may be present at the several locations of the conference.

Personal display: this display is intended for the user but also other people can see it. Example is a display at the workplace: dependent on the workplace, only the user or a limited amount of trusted people can view the content of the display.

Public audio: is an installation which can be used in a presentation to provide audio support for presentation images or videos.

Private Audio: headphones are an example of an actual peripheral to be mapped on a private audio device. In addition, the headphones might be equipped with a sensor that detects if the audio can be heard by the user, so as to enable the rendering of private audio data. Also the music installation at home can be mapped as a Private Audio device for the user.

Private Audio Recorder: This device can be part of a virtual meeting environment. When it is detected and mapped in the docking environment, the incoming audible triggers are disabled and voice message are routed to a recording application. The recording function may be implemented in the dockee, or in a remote device as set up by the user.

Public camera: this is a camera that is positioned in a public environment.

Personal Camera: this camera is intended for the user, but has no access (view) to a user's private environment. Example: a camera at the user's workplace in a office.

Private camera: Such a camera might be available in a docking environment of the user's home. The user might prohibit the use of this camera.

Public Shared Storage is a device on which, after mapping to actual memory, the user can set information which can be shared with others that have access to the storage in the docking environment. A host device might facilitate such storage, by providing an amount of storage space. When the user undocks, the information remains available according to a predefined policy which may be configurable in the virtual docking environment: e.g. information remains available for a defined period of time, to currently docked dockees, or even to new dockees. Such policy may be accomplished by applying Digital Rights Management (DRM) to the content or by configuring an access policy in a conditional access system or by using public/private key encryption.

Group Shared Temporary Storage is a virtual device on which, after mapping to actual memory, the user can set information which can be shared with others that have access to the storage in the docking environment. When the owner of the data undocks, the information will become inaccessible to the other users. So the storage is temporary, during the presence of the dockee only. The owner may be informed about the people who have access to the group shared storage. People who have access are allowed to copy the information. The storage may provide watermarking on the data to keep track of where the data was copied or made available.

Personal Shared Temporary Storage is the similar to the group shared storage, but nobody is allowed to copy the information.

Private Storage is a device to which only the user has access. When the environment is docked by another user or unknown dockee, the data is not accessible. Private Storage can be used in a backup policy (e.g. a private drive in the home of the user that is used for the backups of personal data).

In an embodiment, the dockee processor is arranged for providing at least one presentation policy in the virtual docking environment. A presentation policy is a data structure that defines a set of assignments of peripheral privacy levels, data privacy levels and/or mapping instructions to be applied when activated. The activation may be triggered by the user, or automatically based on the actual location or environment. For example, a presentation policy may be set up for a workspace at home, or for the office, or for a conference room. A presentation policy may comprise one or more of the following setup data:

an assignment of data of elements in a multimedia presentation to a selected virtual peripheral to be applied when selecting the presentation policy;

an assignment of respective data of a same type as generated by an application to respective different virtual peripherals of a same type but having different privacy levels to be applied when selecting the presentation policy;

a mapping configuration to be applied when selecting the presentation policy;

a privacy level assignment for at least one virtual peripheral and/or a privacy level assignment for selected data and/or a selected application to be applied when selecting the presentation policy.

The function of the docking system, based on a virtual docking environment including a presentation policy, using the mapping and data control as described above, is now elucidated based on a practical use case, which requires maintaining privacy during a presentation. The user enters the meeting room, and docks the dockee in the wireless docking environment of the meeting room. The meeting room corresponds to a setup in the presentation policy, which is correspondingly activated. When docked, the virtual devices are mapped to real devices.

For the presentation as defined in the presentation policy, the user needs a public presentation screen and optionally a personal presentation screen for the notes.

If a projection screen and a personal display are available, the mapping can be fully done. Presentation data is displayed on screen and notes on the personal display.

If only a projection screen is available: the presentation data is displayed on the screen, and notes are routed to the display of the dockee, i.e. a private display. It is noted that data having a specific data privacy level, may automatically be routed to a peripheral having a high ranking privacy level, if there is no peripheral have the corresponding peripheral privacy level. A privacy level is considered to have a higher ranking if it indicates a more private level.

If only a personal display is available, e.g. a desktop monitor, this personal display is the next available ranking peripheral, i.e. the most public and visible output method. The presentation data is rendered on the personal display while the notes are on the private display of the dockee.

Optionally, further events, applications and or data may be configured to have privacy levels in the presentation policy, or in general by default in the virtual docking environment. For example, the standard phone application is assigned a private level. So, during the presentation, the presenter may receive a phone call. The information about this call (such as name and/or other address book information) and audio (and/or video) of such call is routed to display and/or audio devices having a private level, e.g. the private display on the mobile phone and/or an audio recorder device. So, even if the user forgot to disable the triggering of these calls, the trigger is not shown on the public presentation screen. However, in an enhanced phone application, a phone call can have a private, personal or even public level, e.g. related to the caller, such as public level is colleagues at work; private level is family or friends, and personal level can be a level in between such as a business contact, supplier contact. Calls may be routed according to their privacy level.

When preparing a presentation on a workplace, the user wants to see the presentation. For the workspace, the user activates the presentation policy for the workspace. In such a case, the workplace display, which may be assigned a personal level, is used to show the presentation data having the public level, while the display on the dockee can be used for the notes. When a phone call is received, the trigger can be shown on the workplace display as this has the personal level, and the phone application may also have the personal level, i.e. the normal policy for treating such calls.

Optionally, there is a defined policy in the virtual docking environment for rendering different types of content from an application. For example in Microsoft PowerPoint, a presentation can be configured to show the notes in the primary monitor and the presentation on "monitor 2". However, in a docking environment, these descriptions have no meaning: if there is only one monitor available in a meeting room, this "primary monitor" is probably used as the public presentation screen. Based on the assignments in the virtual docking environment, the display of a mobile dockee may be assigned a personal level. The application PowerPoint may be assigned a public data level for the presentation data and a personal level for the notes. So, according to the assignments in the virtual docking environment, the presentation show is rendered on any public display device, and the notes are shown on personal displays. Furthermore, the policy may also include an assignment for a situation when the dockee is not docked. For such situation a mapping may be defined in which only the presentation data is rendered on the display of the dockee. The mapping may enable switching between the presentation data and the notes to be displayed on the display of the dockee.

Optionally, the user can manage and change this policy: the reception of a call can be part of the presentation. When the user wants to render the trigger of a business related call on the public presentation screen, the user can overrule the default policy. For example, by defining a different privacy level for calls from a specific source.

Figure 3:
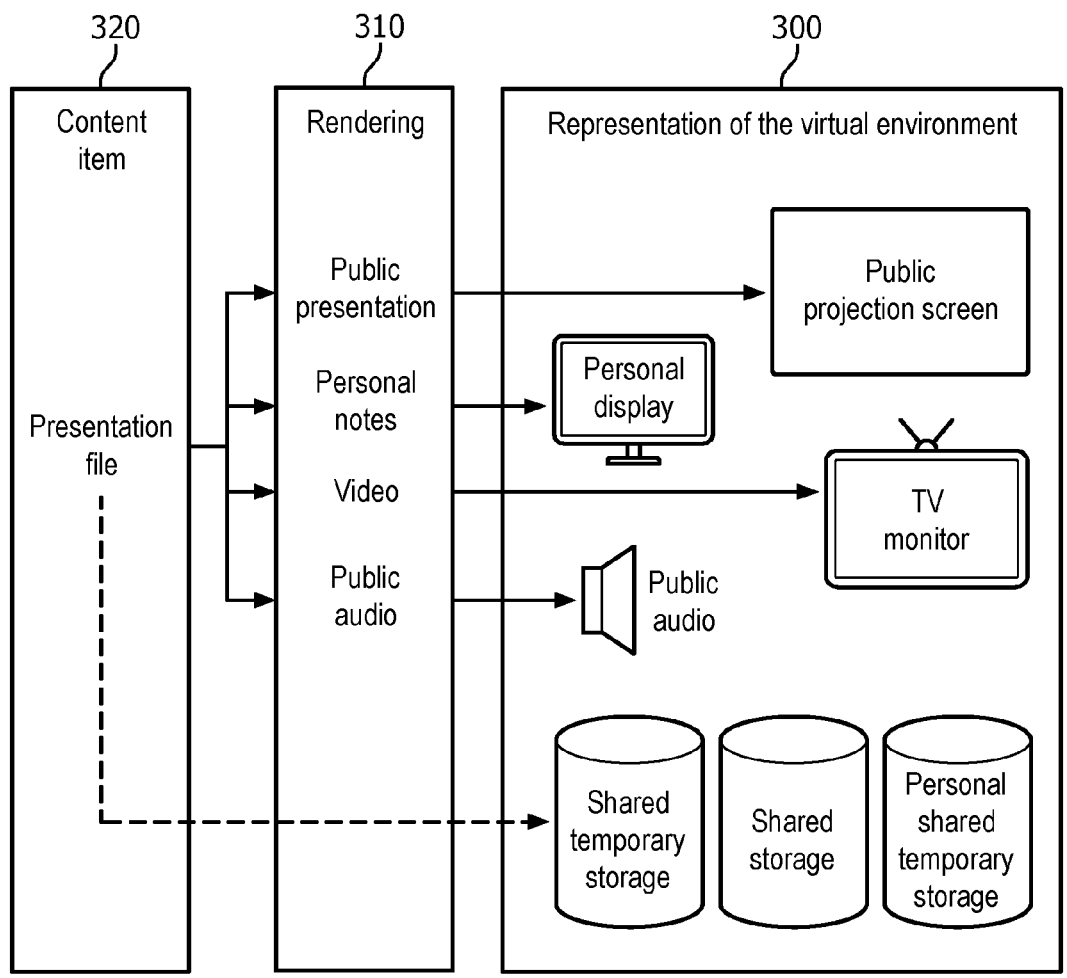
FIG. 3 shows an example of a presentation policy in a virtual docking environment.

FIG. 3 shows a presentation policy in a virtual docking environment. The figure shows data 320, a content item embodied by a presentation file. The data is shown to have multiple data elements, each having a data privacy level, such as public presentation data, personal notes data, public video data and public audio data. In a rendering application 310, the various data elements are retrieved from the presentation file, and have to be routed to a respective peripheral. In FIG. 3, a virtual environment 300 is shown, schematically representing various virtual peripherals, such as a personal display, a public presentation screen, a TV monitor, and a public audio system. The routing of said various data elements to respective virtual peripherals is indicated by arrows. When docking, the required virtual peripherals are mapped to actual available peripherals, and subsequently, data transfer with the actual peripherals is controlled according to the periphery privacy level.

The function of the virtual environment is further elucidated by a further use case. The user may prepare a presentation on the dockee or when docked in his workplace. From the content (e.g. the presentation file), the different rendering needs are derived (e.g. presentation display, notes display, timing clock, light settings, video, 3D video, public audio, private audio, presentation pointer). Rendering data as generated by the application will be routed to the virtual device types according to the assigned privacy levels. In the representation of the virtual environment, a mapping is visualized as a global policy, for a specific type of content, for a specific trigger, or a specific content item. It is noted that also data as such may have a data privacy level, such a private pictures. Also, the location were a file is stored can be used to assign a data privacy level.

In the example as shown in FIG. 3, the presentation contains a public part and personal notes. In the presentation, there is a link to a movie, containing video and audio. According to a predefined presentation policy, the rendering data is routed to a public presentation screen for the presentation;
to a personal display for the notes of the presenter;
to the audio installation for sound;
to a TV monitor (if present in the meeting room) for the video. In that case, the presentation remains visible on the projection screen. If the video is embedded in the presentation as a video window surrounded by other content, the video is shown as part of the data on the public presentation screen.

In an embodiment, the virtual environment comprises, as a virtual peripheral device, a virtual shared memory. The dockee processor is arranged for, when docking, mapping the at least one virtual shared memory on an actual shared memory provided via the host device as the at least one peripheral, and, when docked, controlling data transfer with the actual shared memory according to the periphery privacy level. FIG. 3 shows a shared temporary storage, e.g. having a group privacy level, a public shared storage and a public shared temporary storage. Data having a certain privacy level may be stored on a storage peripheral having a corresponding (or higher) level. In FIG. 3 storing of the presentation file (having public data privacy level) on the public shared temporary storage is schematically indicated by a dashed arrow. If the user wants to intentionally share private content, a copy can be created on a Shared Storage device. The system may ask for a conformation in view of the violation of privacy levels.

For example, during preparation, the user has also the possibility to copy or move the presentation file from his (local or networked) storage to Public Shared Storage. When the user docks together with the other participants in the meeting and presentation, the content is shared between all participants.

In an embodiment, audio device types like "private audio recorder" and "audio silencer" are defined. When these devices are provided, audio triggers can be routed to such device. For example, using a private audio recorder for a phone call, no audible trigger is given and the call is directed to an answering machine. Such application (usually called App) may be implemented on the dockee, or in the host. In a further example using an audio silencer, any audible trigger is routed to be silenced. When docked to an environment having the silencer, no audio is generated for an incoming a phone call and the silencer may translate the audio signal into another type of rendering, e.g. a message on the private screen, an LED that gives a signal. Actual audio devices corresponding to the virtual audio recorder or silencer may be provided in a meeting by the host. When users are docking into the meeting environment, the dockee devices will detect the actual audio recorder device or the audio silencer and map the virtual audio devices on the actual ones. Hence the dockee audio triggers are not rendered in a disturbing way anymore, but are routed to the actual recorder or silencer. Such audio devices as provided by the host may have the personal or private level by providing a password to the dockee, or accepting a password from the dockee, for accessing recorded audio or silenced audio triggers.

Figure 4:
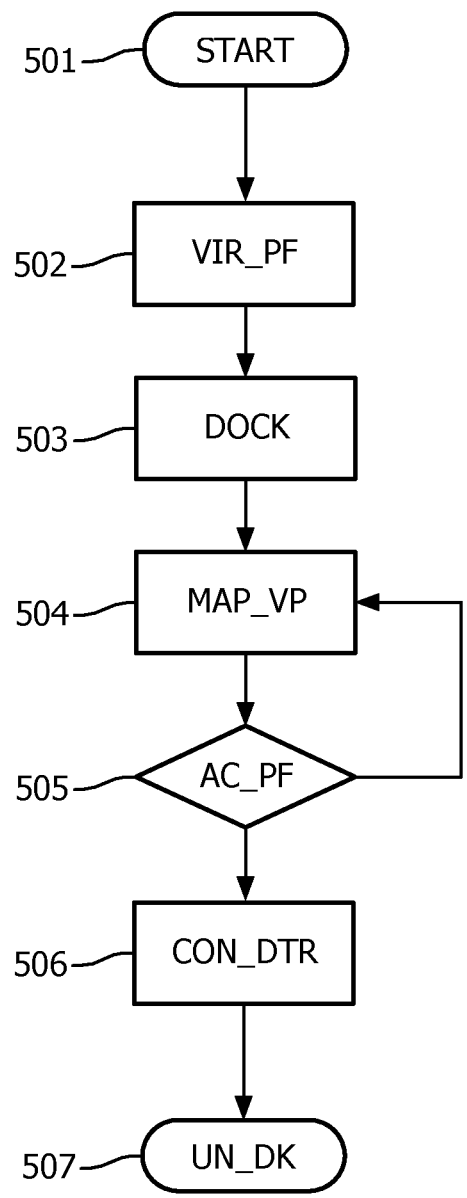
FIG. 4 shows a method of providing wireless docking.

FIG. 4 shows a method of providing wireless docking A host device is arranged for coupling to at least one peripheral, and comprises a host communication unit for accommodating wireless communication to a dockee device, and a docking processor arranged for docking the dockee device for providing access to the at the least one peripheral for the dockee device. The dockee device has a dockee communication unit for accommodating said wireless communication, and a dockee processor arranged for docking at the host device for getting access to the at least one peripheral.

The method starts at step START 501. In a first step VIR_PF 502 at least one virtual peripheral is defined and configured. The virtual peripheral is configured by assigning a privacy level to the virtual peripheral, the privacy level defining a level of confidentiality that is indicative of a relation between a user of the dockee device and other persons having access to a respective peripheral. Effectively, the virtual peripheral device is provided as part of a virtual docking environment. The virtual peripheral device has a privacy level, predefined or assigned, either by its nature or by the user via a user interface. For example, as a virtual peripheral, an external display screen may be provided to represent a public display screen having the public privacy level, and a local display may be provided to represent a personal display screen having the personal privacy level.

Subsequently, at step DOCK 503, the dockee device is docked for providing access to the at least one actual peripheral. Then, the actual peripheral is mapped to a corresponding virtual peripheral in step MAP-VP 504. By mapping the properties and restrictions as defined for the virtual peripheral are now applied to the actual peripheral, e.g. the public screen defined in the virtual docking environment as a virtual peripheral is mapped on a beamer and presentation screen available via the host. Hence, when docking, the virtual peripheral device is mapped on the actual peripheral. In a next step AC-PF 505 it is detected whether further actual peripherals are available. If so, the mapping in step MAP-VP is repeated. If no further peripherals can be mapped, in next step CON_DTR 506 the data transfer to and/or from the actual peripheral is controlled to comply with the assigned privacy level of the peripherals. Data is monitored to be of a corresponding or lower privacy level before being exchanged with the peripheral. Hence, when docked, data transfer with the at least one peripheral is controlled according to the peripheral privacy level.

Finally, in step UN_DK 507, the dockee is removed from the environment of the host, or is actively undocked via the user interface. Any mapping is removed, and data transfer is disabled.

Although the invention has been mainly explained by embodiments using wireless docking, the invention is also suitable for any wireless system where a wireless device needs to connect to, and share, one or more peripherals. It is to be noted that the invention may be implemented in hardware and/or software, using programmable components.

It will be appreciated that the above description for clarity has described embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

The invention claimed is:

1. A dockee device for wireless docking to a host device, the host device being configured for coupling to at least one peripheral device, the dockee device comprising:
 a dockee communication unit for accommodating wireless communication, and
 a dockee processor arranged for wireless docking to the host device for getting access to at least one actual peripheral device, the dockee processor being configured for
 providing at least one virtual peripheral device in a virtual docking environment, the virtual peripheral device having a peripheral device privacy level configured by assigning the peripheral device privacy level to the virtual peripheral device, the peripheral device privacy level defining a level of confidentiality that is indicative of a relation between a user of the dockee device and other persons having access to a respective peripheral device, when docking, mapping the at least one virtual peripheral device on the at least one actual peripheral device, the mapping comprising assigning the peripheral device privacy level to the at least one actual peripheral device, and when docked, controlling data transfer with the at least one actual peripheral device according to the peripheral device privacy level.

2. The dockee device as claimed in claim 1, wherein the dockee processor is configured for providing a user interface for enabling configuring the virtual peripheral device by assigning the peripheral device privacy level, or for displaying the virtual docking environment for enabling the user to perceive which data is to be transferred or rendered by a respective peripheral device.

3. The dockee device as claimed in claim 1, wherein the peripheral device privacy level is from a set comprising at least one of a public level, a group level, a personal level, and a private level.

4. The dockee device as claimed in claim 1, wherein the dockee processor is configured for providing multiple virtual peripheral devices of a same predefined type, respective ones of the multiple virtual peripheral devices having respective different peripheral device privacy levels, and when docked, controlling the data transfer to respective different actual peripheral devices according to the respective different peripheral device privacy levels.

5. The dockee device as claimed in claim 1, wherein the virtual peripheral device is of a predefined type being one of
virtual display screen;
a virtual audio device;
a virtual camera device.

6. The dockee device as claimed in claim 5, wherein the dockee processor is configured for providing the virtual display screen having the peripheral privacy device level for constituting one of
a public presentation screen,
a personal presentation screen,
a private display screen,
a group collaboration screen; or
the virtual audio device having the peripheral device privacy level for constituting one of
a public audio installation,
a group audio installation,
a personal audio installation,
a private audio device,
a private audio recorder,
an audio silencer; or
the virtual camera device having the peripheral device privacy level for constituting one of
a public camera,
a group camera,
a personal camera, or
a private camera.

7. The dockee device as claimed in claim 1, wherein the virtual peripheral device is a virtual shared memory, and the dockee processor is configured for when docking, mapping the at least one virtual shared memory on an actual shared memory provided via the host device as the at least one actual peripheral device, and when docked, controlling data transfer with the actual shared memory according to the peripheral device privacy level.

8. The dockee device as claimed in claim 1, wherein the dockee processor is configured for assigning the peripheral device privacy level to selected data in the dockee device, and, when docked, controlling the data transfer with the at least one actual peripheral according to the peripheral device privacy level and the data privacy level.

9. The dockee device as claimed in claim 1, wherein the dockee processor is configured for assigning the peripheral device privacy level to any data of a selected application in the dockee device, and, when docked, controlling the data transfer of the selected application with the at least one actual peripheral according to the peripheral device privacy level and the data privacy level.

10. The dockee device as claimed in claim 8, wherein the dockee processor is configured for
automatically assigning a predetermined peripheral device privacy level to any data in the dockee device, and
providing a user interface for enabling a user to override the automatically assigned predetermined peripheral device privacy level by a selectable peripheral device privacy level.

11. The dockee device as claimed in claim 1, wherein the dockee processor is configured for providing at least one presentation policy in the virtual docking environment, the presentation policy comprising at least one of
an assignment of data of elements in a multimedia presentation to a selected virtual peripheral device to be applied when selecting the presentation policy;
an assignment of respective data of a same type as generated by an application to respective different virtual peripheral devices of a same type but having different peripheral device privacy levels to be applied when selecting the presentation policy;
a mapping configuration to be applied when selecting the presentation policy;
a privacy level assignment for at least one virtual peripheral device and/or a privacy level assignment for selected data and/or a selected application to be applied when selecting the presentation policy.

12. The dockee device as claimed in claim 1, wherein the dockee processor is configured for receiving configuration data from the host device, and for adapting the configuration of the virtual docking environment or the mapping in accordance with the configuration data, the configuration data comprising at least one of
an instruction to create a virtual peripheral device of a predefined type;
a peripheral device privacy level for a virtual peripheral device of a predefined type;
a peripheral device privacy level for a docked peripheral device of a predefined type;
a data privacy level for selected data in the dockee device;
a data privacy level for any data of a selected application in the dockee device;
a mapping instruction for mapping a virtual peripheral device of a predefined type having a predefined peripheral device privacy level on an actual peripheral device as coupled to the host device.

13. A host device for wireless docking a dockee device, the host device being configured for coupling to at least one peripheral device, the host device comprising:
a host communication unit for accommodating wireless communication, and a docking processor configured for docking at least one dockee device for providing access to the at the least one peripheral device for the dockee device, wherein the docking processor is configured for providing configuration data and sending the configuration data via said wireless communication to the dockee device, the configuration data comprising at least one of an instruction to create a virtual peripheral device of a predefined type;

a peripheral device privacy level for a virtual peripheral device of a predefined type;

a peripheral device privacy level for a docked peripheral device of a predefined type;

a data privacy level for selected data in the dockee device;

a data privacy level for any data of a selected application in the dockee device;

a mapping instruction for mapping a virtual peripheral device of a predefined type having a predefined peripheral device privacy level on an actual peripheral device as coupled to the host device, and the peripheral device privacy level defining a level of confidentiality that is indicative of a relation between a user of the dockee device and other persons having access to a respective peripheral device.

14. A method for wireless docking a host device and a dockee device, the method comprising, in a dockee device, providing at least one virtual peripheral device in a virtual docking environment, the virtual peripheral device having a peripheral device privacy level, configuring the virtual peripheral device by assigning a peripheral device privacy level to the virtual peripheral device, the peripheral device privacy level defining a level of confidentiality that is indicative of a relation between a user of the dockee device and other persons having access to a respective peripheral device, when docking, mapping the at least one virtual peripheral device on the at least one actual peripheral device, the mapping comprising assigning the peripheral device privacy level to the at least one actual peripheral device, and when docked, controlling data transfer with the at least one actual peripheral device according to the peripheral device privacy level.

15. A non-transitory computer-readable medium having one or more executable instructions stored thereon, which when executed by a processor, cause the processor to perform a method for wireless docking a host device and a dockee device, the method comprising, in a dockee device:

providing at least one virtual peripheral device in a virtual docking environment, the virtual peripheral device having a peripheral device privacy level;

configuring the virtual peripheral device by assigning a peripheral device privacy level to the virtual peripheral device, the peripheral device privacy level defining a level of confidentiality that is indicative of a relation between a user of the dockee device and other persons having access to a respective peripheral device;

when docking, mapping the at least one virtual peripheral device on the at least one actual peripheral device, the mapping comprising assigning the peripheral device privacy level to the at least one actual peripheral device; and when docked, controlling data transfer with the at least one actual peripheral according to the peripheral device privacy level.

* * * * *